United States Patent
Lee et al.

(10) Patent No.: US 6,707,493 B1
(45) Date of Patent: Mar. 16, 2004

(54) METHOD AND APPARATUS FOR ERROR DETECTION AND CORRECTION IN IMAGE SENSOR

(75) Inventors: Suk Joong Lee, Ichon-shi (KR); Gyu Tae Hwang, Ichon-shi (KR)

(73) Assignee: Hyundai Electronics Industries Co., Ltd. (KR)

( * ) Notice: Subject to any disclaimer, the term of this patent is extended or adjusted under 35 U.S.C. 154(b) by 0 days.

(21) Appl. No.: 09/343,097

(22) Filed: Jun. 29, 1999

(30) Foreign Application Priority Data

Jun. 30, 1998 (KR) ............................................. 98-25287

(51) Int. Cl.$^7$ .................................................. H04N 9/64
(52) U.S. Cl. ...................................... 348/246; 348/247
(58) Field of Search ................................. 348/246, 247

(56) References Cited

U.S. PATENT DOCUMENTS

| | | | | |
|---|---|---|---|---|
| 5,327,246 A | * | 7/1994 | Suzuki ........................ 348/246 |
| 5,381,175 A | * | 1/1995 | Sudo et al. .................. 348/246 |
| 5,416,516 A | * | 5/1995 | Kameyama et al. ........ 348/246 |
| 5,471,515 A | | 11/1995 | Fossum et al. ................ 377/60 |
| 5,841,126 A | | 11/1998 | Fossum et al. ........... 250/208.1 |
| 5,854,655 A | * | 12/1998 | Watanabe et al. ........... 348/247 |
| 5,883,830 A | | 3/1999 | Hirt et al. ............... 365/185.03 |
| 5,920,344 A | * | 7/1999 | Kim ........................... 348/246 |
| 6,181,830 B1 | * | 1/2001 | Sato ........................... 382/274 |
| 6,346,696 B1 | * | 2/2002 | Kwon ..................... 250/208.1 |
| 6,396,539 B1 | * | 5/2002 | Heller et al. ................ 348/246 |
| 6,423,957 B1 | * | 7/2002 | Kim et al. ............... 250/208.1 |

FOREIGN PATENT DOCUMENTS

JP          06-292088          10/1994
JP          07-023297           1/1995

* cited by examiner

*Primary Examiner*—Andrew Christensen
*Assistant Examiner*—Eric Wisdahl
(74) *Attorney, Agent, or Firm*—Townsend and Townsend and Crew LLP

(57) ABSTRACT

An image sensor according to the present invention can detect and correct an error value of a defective pixel. The image sensor includes an error detection circuit for detecting an error by comparing difference between a current pixel value and a previous pixel value with a predetermined reference value and an error correction circuit for correcting an error value from a pixel, by substituting the previous pixel value for the current pixel value.

16 Claims, 4 Drawing Sheets

METHOD AND APPARATUS FOR ERROR DETECTION AND CORRECTION IN IMAGE SENSOR

FIELD OF THE INVENTION

The present invention relates to an image sensor and, more particularly, a method and apparatus for detecting and correcting values of defect pixels.

DESCRIPTION OF THE PRIOR ART

Generally, an image sensor is an apparatus to capture images using light sensing semiconductor materials. Since brightness and wavelength of light from an object are different in their amount according to the reflection area, electrical signals from pixels are different from one another. These electrical signals are converted into digital signals, which can be processed in a digital circuit, by an analogue-to-digital converter. Thus, the image sensor needs a pixel array having tens to hundreds of thousands of pixels, a converter for converting analogue voltage signals into digital voltage signals, hundreds to thousands of storage devices and so on.

Especially in the image sensor, it is a high quality of picture that determines competitiveness in the markets. However, as described above, since the image sensor needs a plurality of devices such as pixels, converters and so on, a possibility of errors may always exist in fabricating it. When the errors occur, the errors may appear such as spots and lines in the display. Furthermore, since an erroneous image sensor is considered as a device failure, yield may be dramatically reduced with the waste of resources.

SUMMARY OF THE INVENTION

It is, therefore, an object of the present invention to provide an image sensor, which can detect and correct values of defective pixels and then output a corrected data.

In according with an aspect of the present invention, there is provided an image sensor comprising: an error detection circuit for detecting an error by comparing difference between a current pixel value and a previous pixel value with a predetermined reference value; and an error correction circuit for correcting an error value from a pixel, by substituting the previous pixel value for the current pixel value.

The error detection circuit according to the present invention comprises a subtractor creating the difference between the current pixel value and the previous pixel value and a comparator for comparing an output from the subtractor with the predetermined reference value, wherein the predetermined reference value is stored in a programmable register. And the predetermined reference value is determined, based on characteristics of a light sensing area and an analogue-to-digital converter.

In accordance with another aspect of the present invention, there is provided an image sensor comprising: a control and interface means for controlling the image sensor using a state machine and for interfacing the image sensor with an external system; a pixel array including a plurality of pixels sensing images from an object and generating analogue signals according to an amount of incident light; a conversion means for converting the analogue signals into digital signals to be processed in a digital logic circuit; an error detection circuit for detecting an error by comparing difference between a current pixel value and a previous pixel value with a predetermined reference value; and an error correcting means for correcting an error value from the pixels, by substituting previous pixel values for current pixel values.

BRIEF DESCRIPTION OF THE DRAWINGS

The above and other objects and features of the present invention will become apparent from the following description of the preferred embodiments given in connection with the accompanying drawings, in which.

DETAILED DESCRIPTION OF THE PREFERRED EMBODIMENTS

Hereinafter, the present invention will be described in detail referring to the accompanying drawings.

Neighboring pixels in the CMOS image sensor may have, to some extent, continuous values. Accordingly, it is possible to evaluate an error of a pixel by comparing values of the neighboring pixels. For example, if difference between a value of a pixel and those of its neighboring pixels is large, the pixel is considered as a defective pixel.

Figure 1:
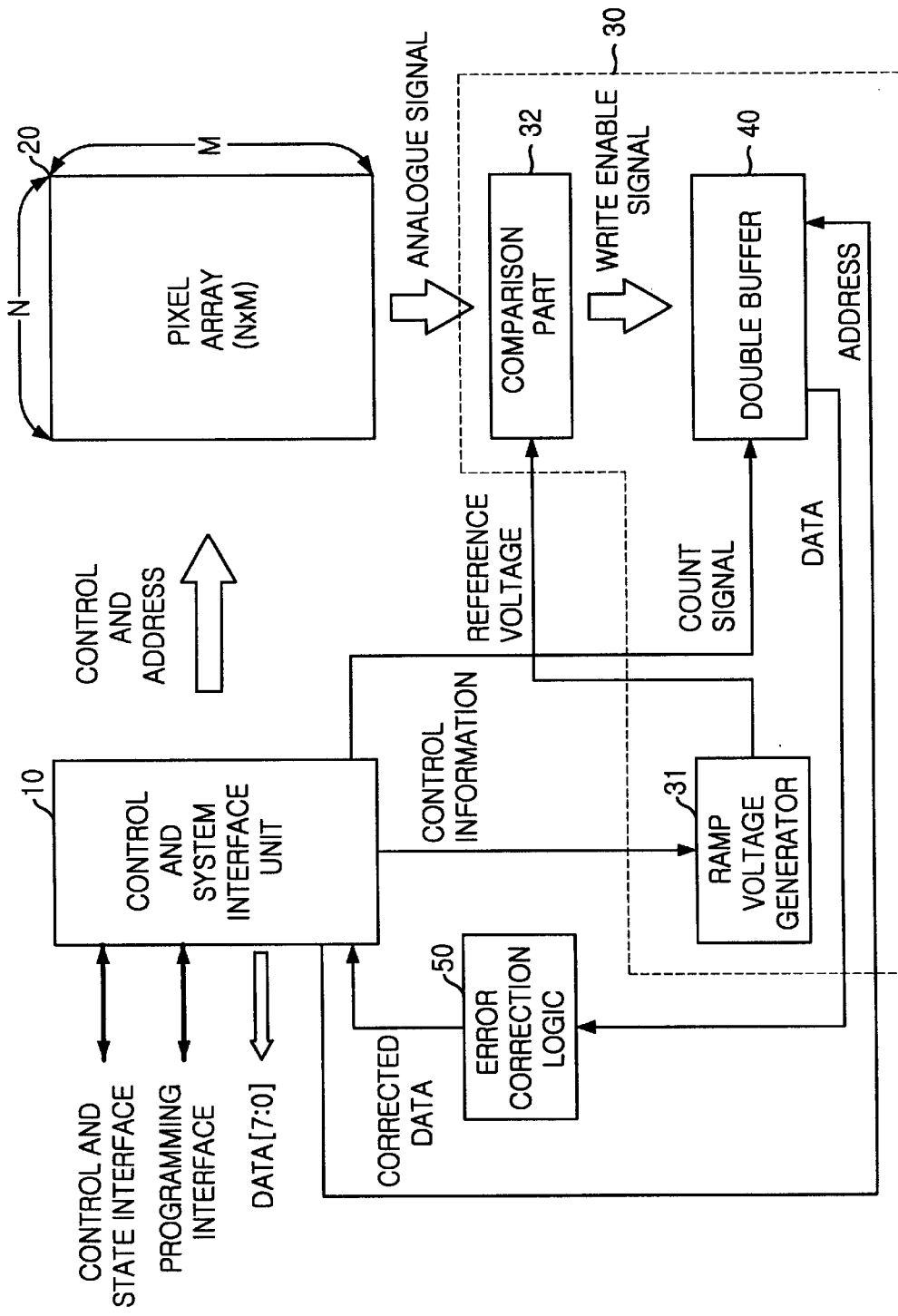
FIG. 1 is a block diagram illustrating a CMOS image sensor in accordance with the present invention.

A CMOS image sensor, which includes a pixel array 20 having 800×600 pixels, a comparison part 32 having 800× 600 comparators and a double buffer 40 having 800×4×8 latches, as shown in FIG. 1.

Also, a CMOS image sensor according to the present includes a control and system interface unit 10 for controlling the imaging by using Finite State Machine (FMS) and for acting as an interface with an external system. A single slope analog-to-digital converter 30 of the CMOS image sensor converts analogue signals from the pixel array 20 into digital signals, a ramp voltage generator 31 generates a reference voltage that is linearly decreased according to clocks, a comparison part 32 compares the reference voltage with an analogue signal from the pixel array 20 and for outputting a write enable signal and a double buffer 40 stores the digitized image values in response to the write enable signal from the comparison part 32.

Furthermore, the CMOS image sensor includes an error correction logic 50 for receiving data from the double buffer 40 and outputting corrected data to the control and system interface unit 10 in response to a programmed value for an error detection.

An external system instructs the command of desired operation to configuration registers in the control and system interface unit 10 through a programming interface. The control and system interface unit 10 properly drives the pixel array 20 based on the programmed information and makes it possible to read out data from the pixel array 20 on the basis of line. Next, the comparison part 32 compares the analogue voltage from the pixel array 20 with the reference voltage from the ramp voltage generator 31 and the compared value is outputted to the double buffer 40 as a write enable signal.

At this time, the single slope analog-to-digital converter 30 converters analogue signals from the pixel array 20 into digital signals. Comparing the ramp voltage with the analogue signals carries out this analog-to-digital conversion. The comparator 32 searches for a point at which the analogue signals are the same as the falling ramp voltage with a determined slope. When the ramp voltage is generated and then starts falling, the control and system interface unit 10 generates count signals to count the degree of the voltage drop. For example, the ramp voltage starting the voltage drop, the converted digital value may be "20" in the case where the analogue signals are the same as the falling ramp voltage at 20 clocks of the control and system interface unit 10. This converted digital value is stored in the double buffer 40 as digital data. Here, the reference voltage is higher than the analogue voltage, the write enable signal is enabled and a counter value from the control and system interface unit 10 is written to the double buffer 40.

The error correction logic 50 receives data that are stored in the double buffer 40 by this way and properly corrects data according to a critical value and a correct control signal. Then, the corrected data is outputted to the control and system interface unit 10 and finally outputted to the external system.

Here, the CMOS image sensor supports a correlated double sampling method (hereinafter, referred to as CDS) in order to remove an offset which is caused by each pixel, the comparison part 32 and so on. The offsets from each pixel and the comparison part 32 can be removed by subtracting a data level from a reset level. That is, by removing an unexpected voltage in each pixel and the comparator 32, it is possible to obtain a net image data value.

Figure 2:
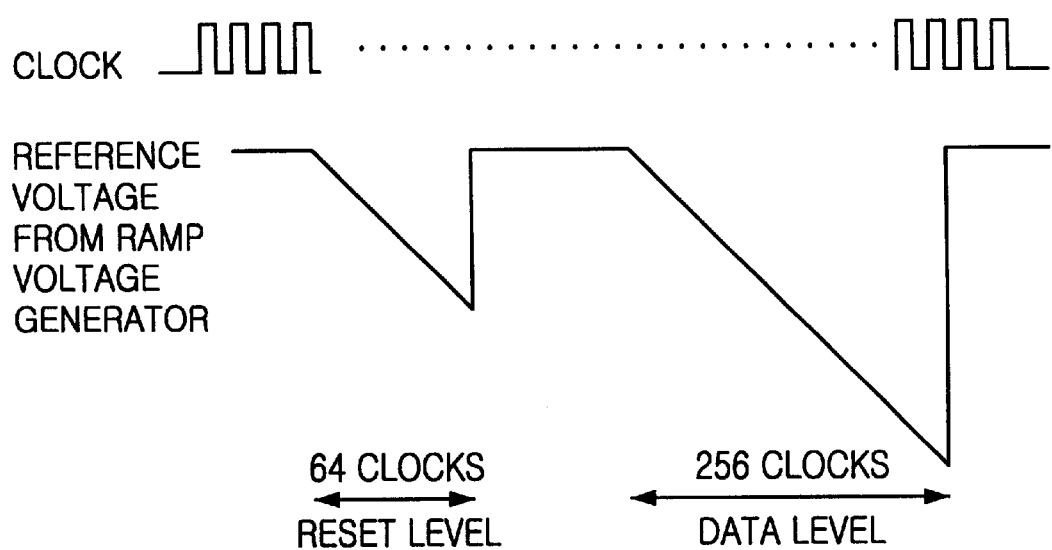
FIG. 2 is a diagram illustrating a concept of CDS.

FIG. 2 is a diagram illustrating a generation of two reference voltages for CDS in the ramp voltage generator 31. The reset and data voltage level samplings are respectively achieved during 64 clocks and 256 clocks, and in case of normal operation the reset voltage level is always higher than the data voltage level, as shown in FIG. 2. This CDS method is well known to those skilled in the art so that detailed description is omitted.

Figure 3:
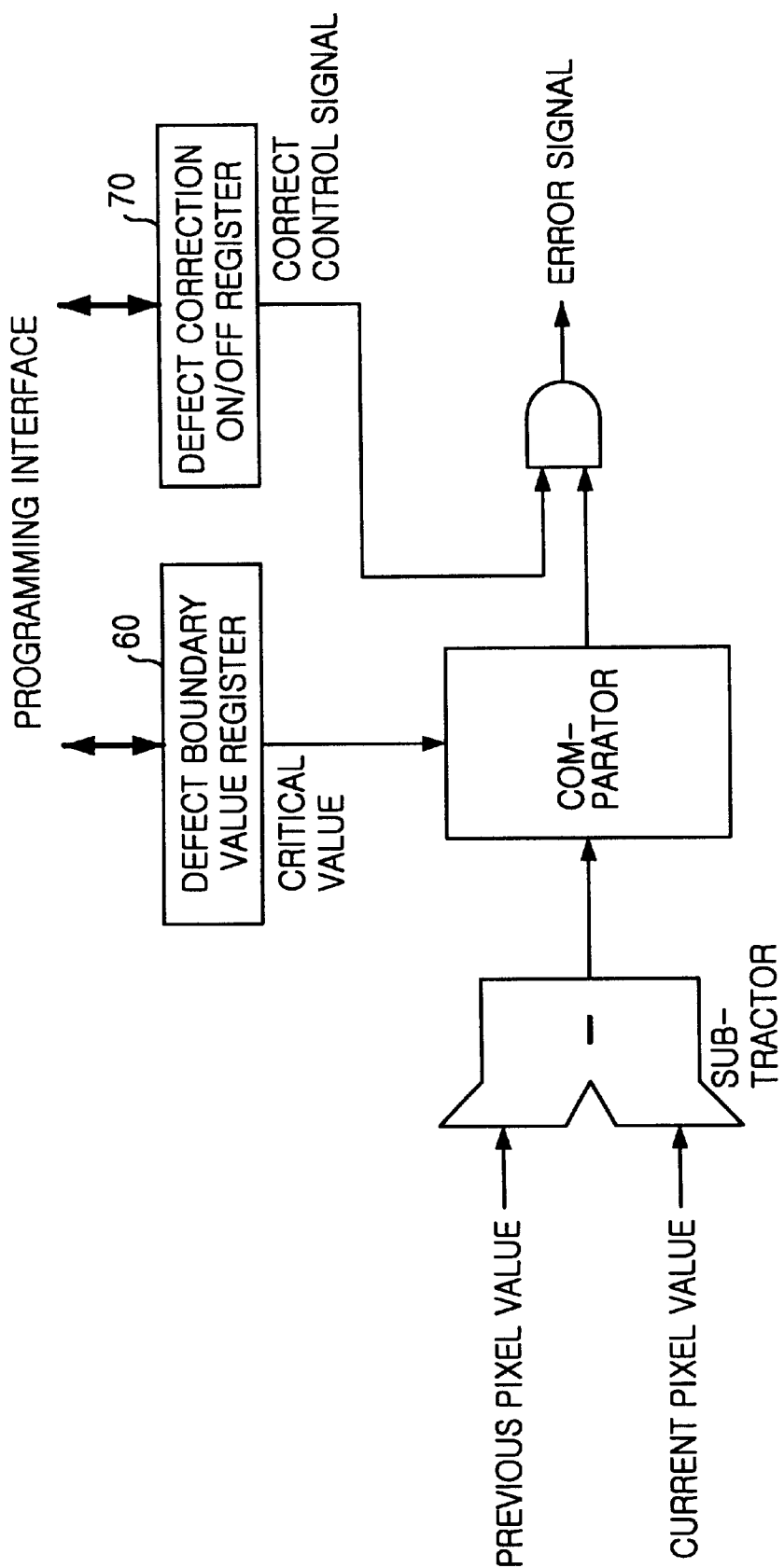
FIG. 3 is a block diagram illustrating a concept of error decision.

FIG. 3 is a block diagram illustrating a concept of error decision. The error decision is carried out, based on the difference between one pixel value and its neighboring pixel values. A subtractor calculates a difference between a previous pixel value and a current pixel value and a comparator compares the difference with a critical value stored in a defect boundary value register 60. In case where the difference between previous the pixel value and the current pixel value is over a predetermined critical value, an error signal is outputted in response to a correct control signal outputted from a correction on/off register 70. Here, the critical value should be effectively determined according to brightness and reflection areas. So, the defect boundary value register 60 are programmable and the defect correction on/off register 70 are programmable, wherein the defect correction on/off register 70 is used when the error-correcting operation is needed.

Figure 4:
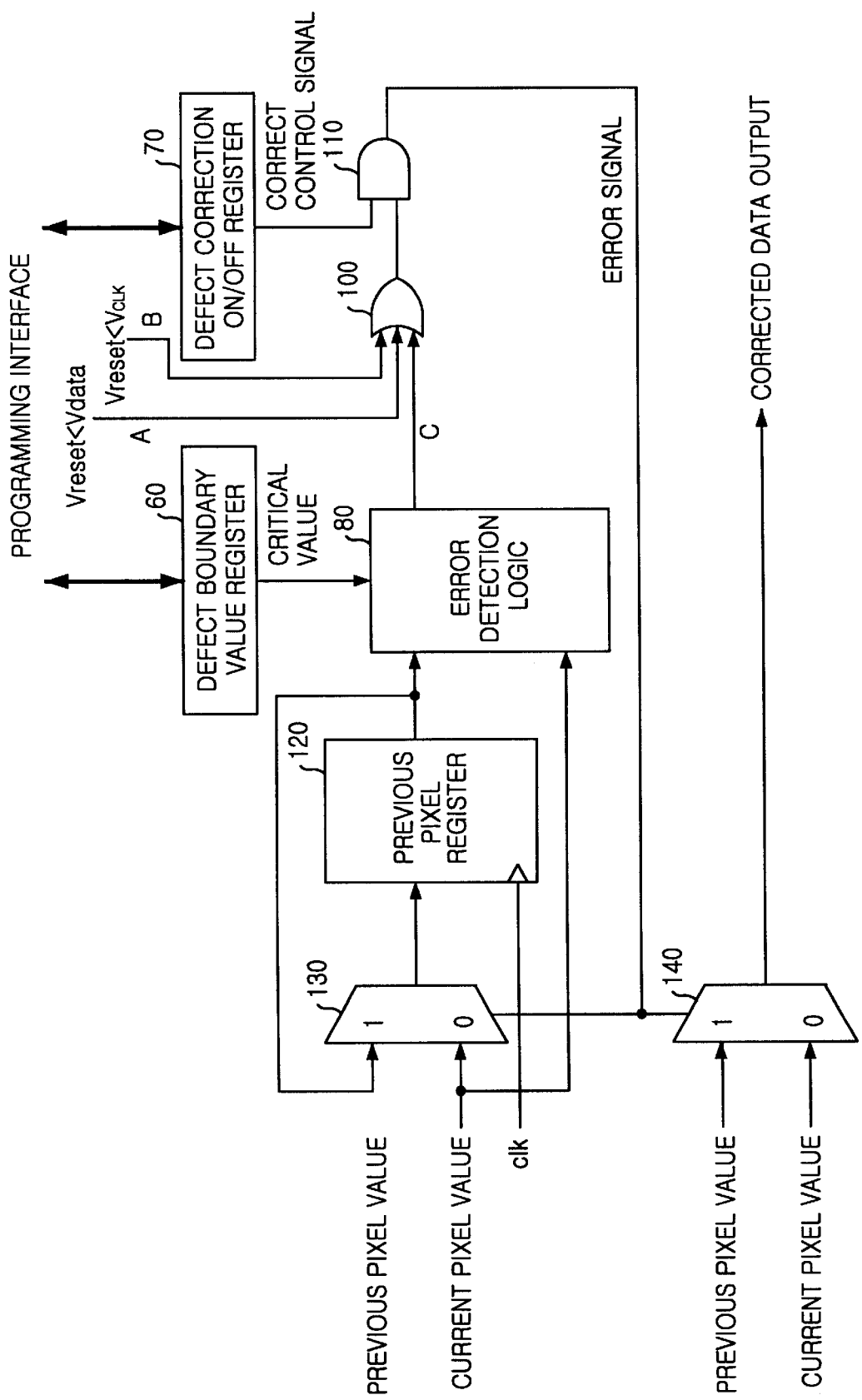
FIG. 4 is a block diagram illustrating an error correction logic in FIG. 1.

FIG. 4 is a block diagram illustrating the error correction logic in FIG. 1. In FIG. 4, a defect boundary value register 60 stores a critical value for evaluating an error of a pixel and a defect correction on/off register 70 outputs a correct control signal to determine an error detecting mode and an OR gate 100 for ORing a first to third control signals A, B and C and for outputting a fourth control signal and an AND gate 110 for ADDing the fourth control signal from the OR gate 100 and the correct control signal from the defect correction on/off register 70 and for outputting an error signal. A previous pixel register 120 stores a previous pixel value, as being synchronized with a clock signal CLK. Also, an error detection logic 80, which includes the subtractor and the comparator in FIG. 3, compares the critical value with a difference value between the previous pixel value from the previous pixel register 120 and a current pixel value and outputting the third control signal C to the OR gate 100. A first multiplexer 130 receives the previous pixel value from the previous pixel register 120 and the current pixel value and outputs either the former or the latter to the previous pixel register 120 in response to the error signal from the AND gate 110. The output data from the first multiplexer 130 is stored again in the previous pixel register 120 for next error detection. Furthermore, a second multiplexer 140 selects either the previous pixel value or the current pixel value in response to the error signal from the AND gate 110 and then outputting the final corrected data.

Here, among the first to third control signals A, B and C inputted to the OR gate 100 in order to decide a corresponding pixel as defective, in case where the reset voltage level is lower than the data voltage level according to CDS ($V_{reset} < V_{data}$), the first control signal A is outputted to decide a pixel as defective irregardless of comparing the previous pixel value with the current pixel value. In case where the reset voltage level is lower than a voltage after counting 64 clocks ($V_{rest} < V_{clk}$), the second control signal B is outputted to decide a pixel as defective irregardless of comparing the previous pixel value with the current pixel value. Also, in case where the difference between the previous pixel value and the current pixel value is over the predetermined critical value, the third C is outputted to a pixel as defective irregardless of anywhere an error is generated, i.e., irregardless of pixel errors, comparator errors or latch errors The error signal from the AND gate 110 is used as a select signal of the first and second multiplexers 130 and 140. When the errors occur in the current pixel, the previous pixel register 120 stores the previous pixel value instead of the current pixel value and also the previous pixel value as the corrected data is outputted to the control and system interface unit (10 in FIG. 1).

Accordingly, the defective pixel of the image sensor can be detected and corrected, and thus the yield of image sensor may be improved.

While the present invention has been described with respect to certain preferred embodiments only, other modifications and variations may be made without departing from the spirit and scope of the present invention as set forth in the following claims.

What is claimed is:

1. An image sensor comprising:
    a selector configured to receive a first pixel value and a second pixel value;
    a first register to receive a first output from the first selector;
    an error detection circuit configured to receive a second output from the first register and the second pixel value to detect an error by comparing difference between the first output of the first register and the second pixel value with a predetermined reference value; and
    an error correction circuit configured to receive a third output of the error; detection circuit and output a corrected pixel value if the third output indicates a pixel error;
    wherein the error detection circuit comprises a subtractor providing the difference between the first output aid the second pixel value; and
    a comparator for comparing a fourth output the subtractor with the predetermined reference value;

wherein the predetermined reference value is stored in a programmable register;

wherein the predetermined reference value is determined based on characteristics of a light sensing area and an analogue to digital converter.

2. The image sensor as recited in claim 1, wherein the image sensor is based on a correlated double sampling method.

3. The image sensor as recited in claim 2, wherein the image sensor further comprises a storing component for storing digital pixel values derived from an analogue to digital converter.

4. The image sensor as recited in claim 3, wherein the third output of the error detection circuit indicates the pixel error if a data voltage level from a pixel is higher than a reset voltage level, wherein the error correction circuit outputs the first pixel value as the corrected pixel value if the third output of the error detection circuit indicates the pixel error, the first pixel value being a previous pixel value and the second pixel value being a current pixel value.

5. An image sensor comprising:

a control and interface means for controlling the image sensor using a state machine and for interfacing the image sensor with an external system;

a pixel array including a plurality of pixels sensing images from an object and generating analogue signals according to an amount of incident light;

a conversion component for converting the analogue signals into digital signals to be processed in a digital logic circuit;

a first selector configured to receive a first pixel value and a second pixel value, the first pixel value being associated with a first given time and the second pixel value being associated with a second given time that is subsequent to the first given time;

a first register to receive a first output of the first selector, the first register being synchronized with a clock signal;

an error detection component configured to receive a second output of the first register and the second pixel value to detect an occurrence of pixel error by comparing difference between the first output of the first register and the second pixel value wit a predetermined reference value; and an error correction component configured to receive a third output of the error detection component and output a corrected pixel value if the third output indicates a pixel error;

wherein the predetermined reference value is determined based on characteristics of a light sensing area and an analogue to digital converter.

6. The image sensor as recited in claim 5, wherein the error correcting component comprises:

a storage component for storing a reference value;

a correction signal component for providing a first control signal; and a first logic for outputting an error signal.

7. The image sensor as recited in claim 5, wherein the error correcting component comprises:

a reference value storing component for storing a reference value used in determining whether or not a pixel error has occurred;

a correction control component for storing a first control signal;

a first logic for determining whether or not a pixel error has occurred using second, third and fourth control signals;

a second logic for outputting an error signal using an output signal of the first logic and the first control signal of the correction control component;

a defect detection component for outputting the fourth control signal upon examining the first pixel value, the second pixel value and the reference value; and a second selector configured to receive the first pixel value and the second pixel value and output either the first pixel value or the second pixel value as a correct value in response to the error signal.

8. The image sensor as recited in claim 7, wherein the defect detection component comprises:

a subtracting means for subtracting the first pixel value and the second pixel value; and a comparing means for comparing an output value from the subtracting means with the reference value and outputting a result of comparison as the fourth control signal.

9. The image sensor as recited in claim 7, wherein the second control signal is a signal for indicating a pixel error if a reset voltage level is lower than a data voltage level according to a correlated double sampling method.

10. The image sensor as recited in claim 7, wherein the third control signal is a signal for indicating a pixel error if the reset voltage level is lower than the data voltage level after N clock cycles.

11. The image sensor as recited in claim 7, wherein the first logic is an OR gate.

12. The image sensor as recited in claim 7, wherein the second logic is an AND gate.

13. A image sensor, comprising:

a first selector configured to receive a first pixel value and a second pixel value, the first pixel value being associated with a first given time, the second pixel value being associated with a second given time;

a second selector configured to receive the first and second pixel values;

an error detector configured to receive the first and second pixel values and determine if a pixel error exists by comparing difference between the first and second pixel values with a predetermined reference value; and an error corrector configured to output an output signal, the output signal being an error signal if the error detector outputs a pixel error signal, wherein the first selector is configured to output the first or second pixel value according to the output signal of the error corrector, wherein the second selector is configured to output the fist or second pixel value according to the output signal of the error corrector, the second selector outputting the first pixel value if the output signal is the error signal;

wherein the predetermined reference value is determined based on characteristics of a light sensing area and an analogue to digital converter.

14. The sensor of claim 13, further comprising:

a register configured to receive an output from the first selector and provide an output to the error detector.

15. The sensor of claim 14, wherein the first given time precedes the second given time.

16. The sensor of claim 13, wherein the first pixel value is a previous pixel value and the second pixel value is a current pixel value.

* * * * *